Jan. 19, 1932.  A. M. McGREGOR  1,841,833
GRIP FOR TRACTOR WHEELS
Filed July 12, 1929
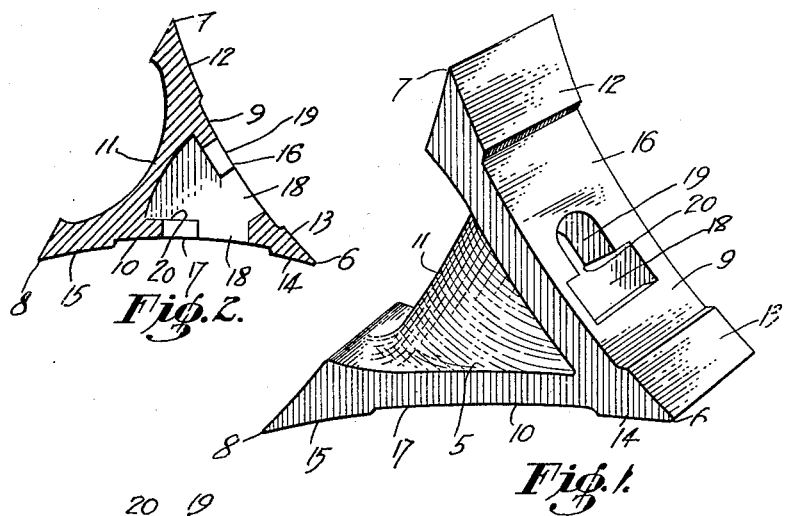
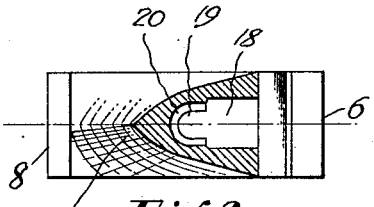
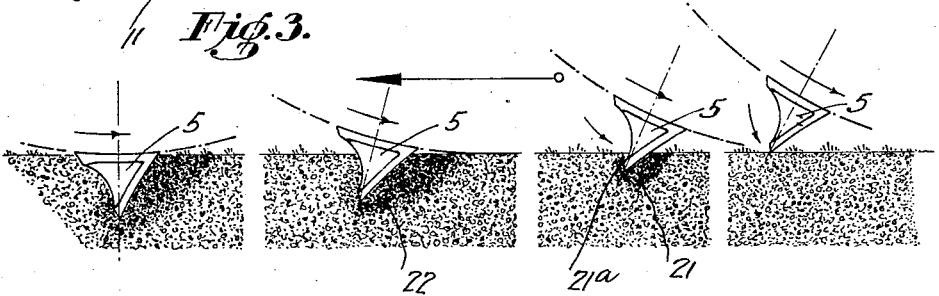
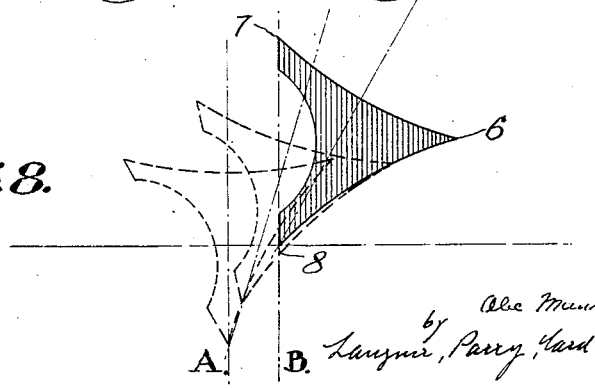

Patented Jan. 19, 1932

1,841,833

UNITED STATES PATENT OFFICE

ALEC MUNRO McGREGOR, OF PARKES, NEW SOUTH WALES, AUSTRALIA

GRIP FOR TRACTOR WHEELS

Application filed July 12, 1929, Serial No. 377,858, and in Australia May 24, 1929.

This invention has reference to grips for tractor wheels and has been devised with the object of producing a grip that will operate efficiently in various classes of country such as sand, ordinary soil or mud.

It is accepted at the present juncture that while a tractor is operating in sand, mud or loose soil, the penetration of the wheels is such that little or no progress is made particularly when the tractor is under load with the result that a large and often unnecessary consumption of fuel takes place for the comparatively small distance travelled by the said tractor while the rearward slippage of the tractor wheels combined with the tendency of the said wheels to bury themselves is such that the tractor virtually becomes inactive as far as soil of this nature is concerned.

An object of this invention is to provide grips for use with tractor wheels, whereby when the tractor is operating in sand or mud an advantage is gained owing to the particular shape of the grips which during penetration of the sand or mud are adapted to compress the same in such manner that the said grips are given the maximum resistance at the rear thereof, which causes the wheels and the tractor to move forwardly as each grip in sequence strikes the sand or mud.

A grip constructed in accordance with my invention has been devised with the object of overcoming the defects outlined above and to provide a grip that will operate efficiently in all classes of country.

In order that the invention be more readily understood reference will now be made to the accompanying drawings in which three constructions carrying the invention into practical effect are illustrated.

Figure 1 is a perspective view of one form of a grip constructed in accordance with my invention.

Figure 2 is a vertical central section thereof.

Figure 3 is a transverse section taken between the points of maximum divergence.

Figures 4, 5, 6 and 7 are views showing the points of contact at initial entry, almost complete penetration, and maximum penetration respectively.

Figure 8 is a view showing the approximate gain obtained between the points of contact and maximum penetration respectively.

In order to accomplish the functions specified and in one form of my invention, I provide a grip 5 having as its major points, the points approximately of a triangle, that is to say, I develop my grip with three points 6, 7 and 8 any of which may be contact points.

The grip is of necessary width as will serve the purpose for which it is designed, and furthermore, it can be manufactured from any suitable material in order that all the features may be integral and of equal tensile strength.

Embracing the three major points 6, 7 and 8 herein referred to are two inclined curved surfaces or walls 9 and 10 which diverge from the point 6, the space between the diverging sides termed curved surfaces 9 and 10 being of special character as will be explained.

Among the main objectives of my invention was to increase to the highest maximum point, resistance to displacement of soil in penetration forwardy and the accumulation of soil masses on the grip 5 between the points of contact and clearance, the latter referring to the moment the grip leaves the soil.

In order to accomplish this, I shaped the grip 5 so that no landing place would be presented which would form a depository for soil and to accomplish this I removed the mass from the line of travel, that is to say, from the front of the grip rearwardly the mass converges and the soil is deflected and cannot accumulate, since no hold is offered for it.

Between the most divergent points 7 and 8 of the inclined walls or sides 9 and 10 of the grip 5 is a partly concave partly convex rib 11 i. e. when taken vertically and centrally between the three points 6, 7 and 8, the rib 11 is substantially concave (see Figure 2) but a line drawn centrally and vertically between the two points 7 and 8 bordering the rib 11 and through the apex or third point 6 will reveal a substantially convex outline diverging in the line of the third point 6 (see Figure 3.)

I do not wish to be limited to the precise shape of the rib since I may desire to retain only the convex feature.

The two slanting sides 9 and 10 of the grip 5 (other than that side on which the rib 11 occurs) are provided with raised portions 12, 13, 14 and 15 at each end 6, 7 and 8, thus producing depressions 16 and 17 while maintaining the same curvature as will fit the wheel rim.

Furthermore, by forming the two sides 9 and 10 in this manner two objectives are attained, one that the raised portions 12, 13, 14 and 15 will accommodate themselves and consequently the grip 5 to any reasonable diameter of wheel, while the depressions 16 and 17 permit the rim being drawn in sufficiently to insure the grip 5 against voluntary displacement.

The two depressions 16 and 17 have cavities or pockets formed therein for the reception of a bolt, by which the grip is held to the rim, the said cavities having a shape which comprises an enlarged pocket 18 to permit easy entery for the bolt head while a narrower passageway 19 joins the pocket 18 and along which the bolt stem is adapted to be slid, the head of the bolt abutting against the shoulder 20 provided.

By providing two inclined curved walls 9 and 10 to the grip 5 together with the associated bolt cavities described, the grip is rendered reversible for when one toe or point as 8 is worn the bolt is slackened and removed and the grip reversed to present a new toe as 7 to the soil.

Referring to Figures 4 to 7 inclusive, it will be seen that in Figure 4 the point 8 has contacted with the soil and during the motion of the wheel forwardly as in Figure 5 the point 8 of the grip 5 has made the initial penetration and has commenced to compress and pack the soil to the rear thereof as at 21, while a slight compression takes place about the area 21a, further partial rotation of the wheel causes greater penetration and consequently greater compression of the soil as shown by 22, Figure 6, while maximum penetration has taken place in Figure 7 and also maximum compression of soil to the immediate rear of the grip 5 and it will be obvious that a slight compression effect it directed on the soil by the entry of the grip until maximum penetration occurs.

The compression of the soil is brought about by the shape of the grip 5 and the weight of the tractor since the weight combined with the tractor wheel moving forwardly and the curvature of the grip directs the pressure upon the desired area and prevents displacement before the grip has completed its function.

With reference to Figure 8 this shows diagrammatically the approximate gain by "creep" between the point of contact and that of maximum penetration, the point 8 when at the maximum penetration point A, an appreciable distance forwardly of the point 8 of the contact point B.

The function described in the preceding paragraphs forms a very essential feature of my grip since not only is no ground lost in operation but lineal distance is actually gained without any increase in fuel consumption or without any departure from the construction of the tractor as a whole.

Another important feature resides in the partly concave partly convex rib 11 which is adapted to positively prevent the adherence of soil to the grip 5.

In the maximum penetration position of the grip 5 as illustrated in Figure 7 the rib 11 is situated in the soil as shown, and as the tractor wheel revolves, the grip and the said rib 11 are drawn out in wedge fashion from the soil, leaving a cavity therein conforming interiorly to the shape of the rib 11, whereby no projections are provided which would tend to accumulate soil on the grips.

What I claim as my invention and desire to secure by Letters Patent is:—

A tractor wheel grip characterized by two slanting and curved surfaces diverging from a common edge and having a partly convex partly concave rib associated therewith, said rib being concave when taken between the points of divergence of the slanting curved surfaces and convex when taken sectionally between the points of maximum divergence and towards the edge from which the slanting sides diverge.

Signed at Melbourne, Victoria, Australia, this 31st day of May, A. D. 1929.

ALEC MUNRO McGREGOR.